No. 686,056. Patented Nov. 5, 1901.
G. C. HALE & O. C. WIESNER.
FIRE EXTINGUISHER.
(Application filed June 21, 1901.)
(No Model.)

Witnesses

Inventors
George C. Hale
and Oscar C. Wiesner
by Edson Bros
Attorneys

UNITED STATES PATENT OFFICE.

GEORGE C. HALE AND OSCAR C. WIESNER, OF KANSAS CITY, MISSOURI.

FIRE-EXTINGUISHER.

SPECIFICATION forming part of Letters Patent No. 686,056, dated November 5, 1901.

Application filed June 21, 1901. Serial No. 65,502. (No model.)

*To all whom it may concern:*

Be it known that we, GEORGE C. HALE and OSCAR C. WIESNER, citizens of the United States, residing at Kansas City, in the county of Jackson and State of Missouri, have invented certain new and useful Improvements in Fire-Extinguishers; and we do hereby declare the following to be a full, clear, and exact description of the invention, such as will enable others skilled in the art to which it appertains to make and use the same.

Our invention relates to certain improvements in chemical fire-extinguishers, more especially that class effecting the commingling of the acid and alkaline solution previous to liberation.

It has for its object to provide more especially for such commingling or combination of said solution and acid or ingredients at the most advantageous point before removal or liberation from the containing receptacle or tank, to effectually guard against the liability of the inoperativeness of the extinguisher, as is in practice found to be the case in the use of this class of fire-extinguishers generally; also, to render the apparatus reliable and simple in operation, particularly in combining the acid with the alkaline solution, and to promote simplicity of construction and arrangement of the parts.

It consists of the combination of parts, including their construction and arrangement, substantially as hereinafter more fully disclosed, and specifically pointed out by the claims.

Figure 1:
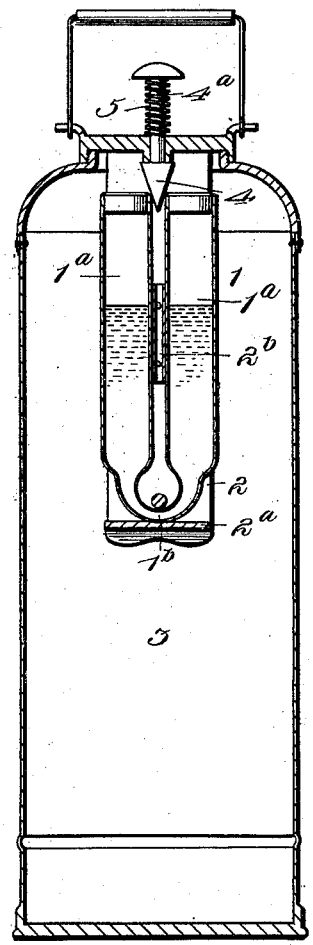
Figure 2:
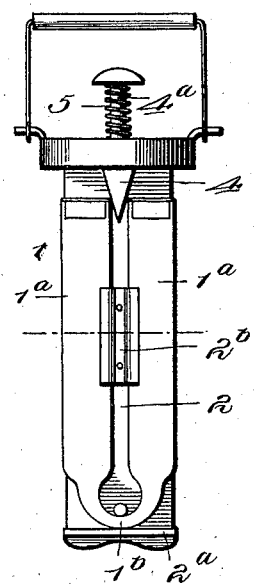
Figure 3:
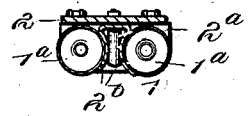

In the accompanying drawings, illustrating the preferred embodiment of our invention, Figure 1 is a vertical central section. Fig. 2 is a front elevation of the acid-holder with its adjunctive parts removed from the containing-receptacle which holds the alkaline solution. Fig. 3 is a horizontal or transverse section of the same.

Latitude is allowed herein as to details, as they may be changed or varied at will without departing from the spirit of our invention and the same yet remain intact and be protected.

In carrying out our invention we employ an acid-holder 1, preferably U shape and of glass or other refrangible or readily-breakable substance. It consists of two tubes $1^a$ $1^a$, with hermetically-sealed upper ends, continuously connected at their lower portions by a preferably constricted tubular yoke $1^b$ to render it readily vulnerable at that point to a breaking action, as more fully made apparent hereinafter. The altitude of the acid in the tubes of the holder 1 is indicated by dotted lines upon the drawings. Said acid-holder is suitably held upon a support or bracket 2, having at its lower end a hinged suitably-upheld shelf or leaf $2^a$ for the bottom of said holder to rest upon, and a double spring-clasp $2^b$, centrally secured to said support, with its outward-curved arms clasping or contacting with the tubes of said acid-holder, as clearly seen in Figs. 2 and 3. The attachment to and removal from said support 2 of said acid-holder is readily apparent, the hinged leaf being swung downward in either instance and the tubes of said acid-holder being inserted behind the curved arms of said clasp in placing the holder in position.

A receptacle or tank 3, holding the alkaline solution, receives the acid-holder attached to the support or bracket, as shown in Fig. 1. This receptacle has centrally passing through its top the stem or rod $4^a$ of a plunger or wedge 4, arranged within said receptacle with its point initially resting or held between the upper ends of the tubes of the acid-holder. The upper preferably capped end of said stem is normally held some distance above the top or cover of the receptacle 3 by the action of a spring 5 with its ends confined between the cap of the plunger-stem and the receptacle-cover. It will be observed that by forcibly actuating the plunger it will be driven down between the tubes of the acid-holder, the spreading action thus exerted upon said tubes delivering the breaking action upon their constricted yoke portion, effecting the instant release of the acid well down near the bottom of the last named to provide for a more intimate combination or commingling of the acid and alkaline solution, whence the mixture is permitted to be suitably delivered therefrom through a nozzled and valved hose or pipe, as well understood.

Having thus fully described our invention, what we claim, and desire to secure by Letters Patent, is—

1. A chemical fire-extinguisher having an acid-holder, comprising tubular arms and a constricted tubular portion connecting the lower ends of said arms, the upper end terminals of said arms being unconnected, and means adapted to deliver the blow between said unconnected upper end terminals to effect the breaking of said acid-holder at the lower end connected portion, substantially as set forth.

2. A chemical fire-extinguisher having an acid-holder comprising tubular arms, and a constricted tubular portion or yoke connecting the lower ends of said arms, and a wedge-shaped plunger adapted to deliver its blow between and upon said arms, substantially as set forth.

3. A chemical fire-extinguisher, comprising a U-shaped acid-holder having a constricted yoke connection between the arms or tubes thereof and means for acting upon said acid-holder so as to effect the breaking thereof at said constricted portion, substantially as set forth.

4. A chemical fire-extinguisher, comprising a U-shaped acid-holder, with a constricted yoke portion connecting the arms or tubes thereof, and a wedge-shaped plunger adapted to deliver its blow between and upon said arms, substantially as set forth.

5. A chemical fire-extinguisher, comprising a U-shaped acid-holder, with a constricted yoke portion connecting the arms or tubes thereof, a wedge-shaped plunger adapted to deliver its blow between, and upon, said arms or tubes, and a receptacle containing an alkaline solution, the stem of said plunger passing through the cover or top of said receptacle and equipped with a spring adapted to retain said plunger in its normal position, substantially as set forth.

In testimony whereof we affix our signatures in presence of two witnesses.

GEORGE C. HALE.
OSCAR C. WIESNER.

Witnesses:
JOHN SUTHERLAND,
T. W. HOUSTON.